(12) United States Patent
Mehdi et al.

(10) Patent No.: US 10,632,913 B2
(45) Date of Patent: Apr. 28, 2020

(54) VEHICLE BEHAVIOR USING INFORMATION FROM OTHER VEHICLES LIGHTS

(71) Applicant: GM Global Technology Operations LLC, Detroit, MI (US)

(72) Inventors: Syed B. Mehdi, Farmington Hills, MI (US); Yasen Hu, Warren, MI (US); Upali P. Mudalige, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 132 days.

(21) Appl. No.: 15/952,904

(22) Filed: Apr. 13, 2018

(65) Prior Publication Data

US 2019/0315274 A1    Oct. 17, 2019

(51) Int. Cl.
*B60Q 1/00* (2006.01)
*B60Q 9/00* (2006.01)
*G06K 9/00* (2006.01)
*G05D 1/02* (2020.01)
*G06K 9/62* (2006.01)

(52) U.S. Cl.
CPC .......... *B60Q 9/005* (2013.01); *G05D 1/0223* (2013.01); *G05D 1/0246* (2013.01); *G06K 9/00825* (2013.01); *G06K 9/6212* (2013.01); *G05D 2201/0213* (2013.01)

(58) Field of Classification Search
CPC ..................................... B60Q 9/005
See application file for complete search history.

(56) References Cited

U.S. PATENT DOCUMENTS

| 6,630,892 | B1* | 10/2003 | Crockford | B60W 40/04 340/436 |
| 8,630,793 | B2* | 1/2014 | Takemura | B60W 30/12 701/1 |
| 9,637,965 | B1* | 5/2017 | Kothari | E05F 15/40 |
| 9,690,297 | B1* | 6/2017 | Ferguson | G08G 1/0104 |
| 9,892,332 | B1* | 2/2018 | Wendel | G06K 9/00825 |
| 10,176,524 | B1* | 1/2019 | Brandmaier | G06Q 40/08 |
| 2003/0167121 | A1* | 9/2003 | Ockerse | G01C 17/30 701/530 |
| 2011/0084176 | A1* | 4/2011 | Reichelt | B61L 23/041 246/473.1 |
| 2011/0279676 | A1* | 11/2011 | Terada | A61B 5/0006 348/148 |
| 2013/0214939 | A1* | 8/2013 | Washlow | G01S 7/003 340/901 |
| 2014/0049646 | A1* | 2/2014 | Nix | B60R 1/002 348/148 |
| 2014/0232869 | A1* | 8/2014 | May | H04N 7/18 348/148 |
| 2014/0379233 | A1* | 12/2014 | Chundrlik, Jr. | B60T 8/171 701/70 |

(Continued)

*Primary Examiner* — Alex C Dunn
(74) *Attorney, Agent, or Firm* — Quinn IP Law

(57) ABSTRACT

A method for controlling an operating vehicle includes: (a) determining, via a controller, a confidence level that the light of the other vehicle is ON based on images captured by a camera of the operating vehicle; and (b) controlling, via the controller, an alarm of the operating vehicle based on the confidence level that the light of the other vehicle is ON.

16 Claims, 9 Drawing Sheets

(56) References Cited

U.S. PATENT DOCUMENTS

| | | | |
|---|---|---|---|
| 2015/0178998 A1* | 6/2015 | Attard | G07C 5/008 |
| | | | 701/23 |
| 2016/0229395 A1* | 8/2016 | Schmudderich | G08G 1/162 |
| 2017/0021863 A1* | 1/2017 | Thompson | B60R 1/00 |
| 2017/0025017 A1* | 1/2017 | Thomas | G06K 9/00798 |
| 2017/0168502 A1* | 6/2017 | Gordon | G06K 9/00791 |
| 2017/0197617 A1* | 7/2017 | Penilla | B60W 30/09 |
| 2017/0218678 A1* | 8/2017 | Kothari | E05F 15/73 |
| 2017/0270375 A1* | 9/2017 | Grauer | G01S 17/107 |
| 2017/0329332 A1* | 11/2017 | Pilarski | B60W 50/0097 |
| 2018/0025636 A1* | 1/2018 | Boykin | G11B 27/102 |
| | | | 701/1 |
| 2018/0113453 A1* | 4/2018 | Ceylan | B60W 30/00 |
| 2018/0170373 A1* | 6/2018 | Kwon | B60W 30/0956 |
| 2019/0108753 A1* | 4/2019 | Kaiser | B60Q 9/00 |
| 2019/0188495 A1* | 6/2019 | Zhao | G06K 9/6202 |
| 2019/0243364 A1* | 8/2019 | Cohen | B60Q 9/00 |

* cited by examiner

VEHICLE BEHAVIOR USING INFORMATION FROM OTHER VEHICLES LIGHTS

INTRODUCTION

The disclosure relates to control and operation of vehicles.

While some vehicles can provide warning cues for certain road condition, these warning cues do not depend on the status of the lights of other vehicles. However, the status of vehicle lights may indicate road conditions that may benefit from warning cues. Further, current autonomous vehicles do not take into account whether the lights of other vehicle lights are ON or OFF. Also, current autonomous vehicles do not anticipate that a parking spot will be vacated. Accordingly, it is desirable to develop systems and method for using information about the lights of other vehicles to control the behavior of a manual vehicle or an autonomous vehicle.

SUMMARY

The present disclosure describes systems and methods that use vision sensors, such as cameras, to detect whether the lights of other vehicles are ON or OFF. This information can be used to anticipate the motion of the other vehicles before any movement occurs. Consequently, warning cues may be provided to the vehicle operator. Similarly, the motion of an autonomous vehicle may be altered based on the information about the lights of the other vehicles.

An exemplary method for controlling a vehicle includes: (a) determining, via a controller, a confidence level that the light of the other vehicle is ON based on images captured by a camera of the operating vehicle; and (b) controlling, via the controller, an alarm of the operating vehicle based on the confidence level that the light of the other vehicle is ON. Controlling, via the controller, the alarm of the operating vehicle may include: determining, via the controller, that the confidence level is greater than a first predetermined threshold; and activating, via the controller, the alarm of the operating vehicle in response to determining that the confidence level is greater than the first predetermined threshold. Controlling, via the controller, the alarm of the operating vehicle may include: determining, via the controller, that the confidence level is less than a second predetermined threshold; and deactivating, via the controller, the alarm of the operating vehicle in response to determining that the confidence level is less than the second predetermined threshold, wherein the first predetermined threshold is greater than the second predetermined threshold. Controlling, via the controller, the alarm of the operating vehicle may include: determining, via the controller, that the confidence level is less than the predetermined threshold; and maintaining, via the controller, the alarm of the operating vehicle deactivated in response to determining that the confidence level is less than the predetermined threshold. The alarm may include a haptic feedback emitted from a haptic seat of the operating vehicle.

The method may further include determining, via the controller, that the confidence level is greater than a first predetermined threshold; and redistributing computational resources of the controller to increase an allocation of the computational resources of the controller used to visually analyze the other vehicle in response to determining that the confidence level is greater than the first predetermined threshold. The method may further include: determining, via the controller, that the confidence level is less than a second predetermined threshold; and redistributing computational resources of the controller to decrease an allocation of the computational resources of the controller used to visually analyze the other vehicle in response to determining that the confidence level is less than the second predetermined threshold. The method may further include updating, via the controller, a trajectory cost based on a speed of the operating vehicle and the confidence level. Updating the trajectory cost may include increasing the trajectory cost as a function of the confidence level, wherein an increase in the trajectory cost is proportional to the confidence level. Updating the trajectory cost may include increasing the trajectory cost as a function of a speed of the operating vehicle, wherein an increase in the trajectory cost is proportional to the speed of the operating vehicle. The trajectory cost will be increased solely for trajectories that go near the target vehicle.

The method may further include updating a maximum allowed speed of the operating vehicle as a function of the confidence level, wherein the maximum allowed speed of the operating vehicle is inversely proportional to the confidence level. The method may further include: determining a distance from a potential trajectory to the other vehicle. Updating the trajectory cost may include increasing the trajectory cost as a function of the distance from the potential trajectory to the other vehicle. The increase in the trajectory cost may be inversely proportional to the distance from the potential trajectory to the other vehicle. The method may further include updating a minimum allowed distance from the operating vehicle to the other vehicle as a function of the confidence level, wherein the minimum allowed distance from the operating vehicle to the other vehicle is directly proportional to the confidence level. The method may further include determining a final trajectory of the operating vehicle based on the updated trajectory cost, the maximum allowed speed of the operating vehicle, and the minimum allowed distance from the operating vehicle to the other vehicle. The method may further include: after determining the confidence level that the light of the other vehicle is ON, determining a confidence level that a reverse light of the other vehicle is ON; determining a time from the determining the confidence level that the light of the other vehicle to detect whether the light is ON to a present moment; updating a trajectory cost of the operating vehicle as a function of the time, the confidence level that the light of the other vehicle is ON, and the confidence level that a reverse light of the other vehicle is ON. Determining the Confidence level that the light of the other vehicle is ON may include: bounding the other vehicle in a bounding box; using, via the controller, an orientation of the other vehicle to identify areas of interest as possible pixel locations for the light of the other vehicle; searching, via the controller, for predetermined pixel color ranges in the areas of interest; and searching, via the controller, for a difference in brightness between the areas of interest and a remaining area within the bounding box.

The present disclosure also describes a subject vehicle that includes a vehicle body, camera coupled to the vehicle body, and a controller coupled to the camera. The camera is configured to capture images. The controller is programmed to execute any of the methods described above.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 14 is a schematic illustration of an example showing how the spatial monitoring controller executes a method to determine a final trajectory of an autonomous vehicle when another vehicle has its turn signal ON.

FIG. 15 is a schematic illustration of an example showing how the spatial monitoring controller executes a method to determine a final trajectory of an autonomous vehicle when another vehicle has its emergency lights ON.

DETAILED DESCRIPTION

Figure 1:
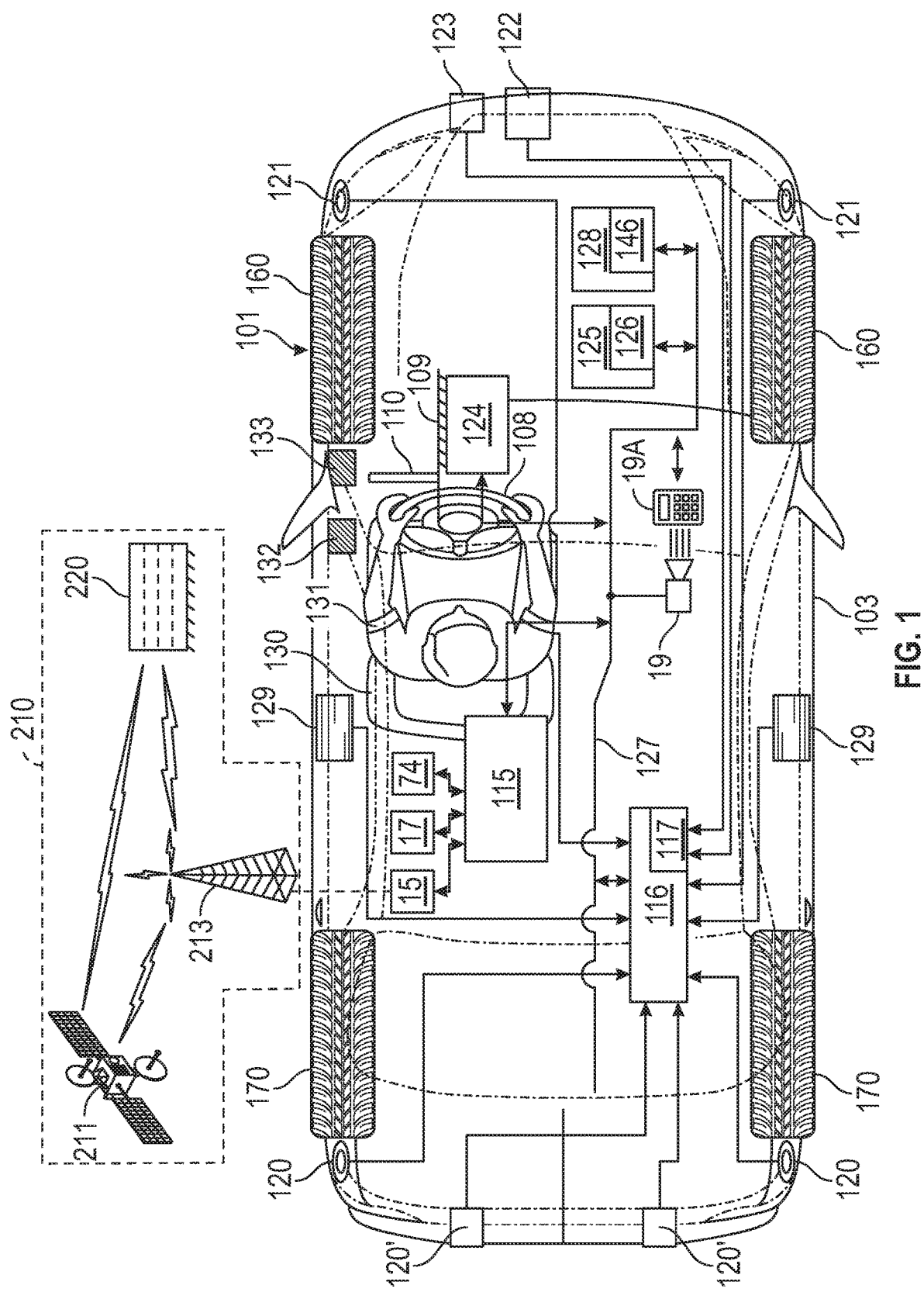
FIG. 1 is a schematic plan view of a subject vehicle including a camera to capture images.

Referring now to the drawings, wherein the showings are for the purpose of illustrating certain exemplary embodiments and not for the purpose of limiting the same, FIG. 1 schematically shows a subject vehicle 101 employing one or a plurality of autonomic vehicle control systems that is illustrative of the concepts described herein. The subject vehicle 101 includes a vehicle body 103 and may be a four-wheel passenger vehicle with steerable front wheels 160 and fixed rear wheels 170. The subject vehicle 101 may include, by way of non-limiting examples, a passenger vehicle, a light-duty or heavy-duty truck, a utility vehicle, an agricultural vehicle, an industrial/warehouse vehicle, or a recreational off-road vehicle. The subject vehicle 101 preferably includes a spatial monitoring system 116, a vehicle monitoring system 115, and a communication controller 19. Operation of the subject vehicle 101 may be controlled by a powertrain control module (PCM) 125, a vehicle control module (VCM) 128, and other suitable controllers. The subject vehicle 101 may also be referred to as the operating vehicle.

The subject vehicle 101 preferably includes one or a plurality of autonomic vehicle control systems, including, e.g., an adaptive cruise control system (ACC) 126, a lane guidance and lane keeping system, a lane change system, a steering assist system, an object avoidance system, and a parking assistance system, among others. By way of example, the PCM 125 includes the ACC 126 for controlling vehicle braking and acceleration to control vehicle speed and acceleration, including autonomous control of vehicle braking and acceleration to control vehicle speed and acceleration under predetermined conditions. The VCM 128 includes steering controller (STRG) 146 for controlling vehicle lateral motion control, e.g., as part of a lane guidance, lane keeping or lane change system. The spatial monitoring system 116, vehicle monitoring system 115, PCM 125, VCM 128, and communication controller 19 preferably communicate therebetween using a high-speed local area network communication bus 127. The spatial monitoring system 116, vehicle monitoring system 115, PCM 125, and VCM 128 of the subject vehicle 101 are shown as discrete elements for ease of description. It should be appreciated that the functions described and performed by the discrete elements may be executed using one or more devices that may include algorithmic code, predetermined calibrations, hardware, application-specific integrated circuitry (ASIC), and/or off-board or cloud-based computing systems.

The spatial monitoring system 116 includes a spatial monitoring controller 117 that communicates with sensing devices to monitor and generate digital images representing remote objects (e.g., other vehicles) proximate to the subject vehicle 101. In addition, the spatial monitoring controller 117 includes an internal clock to measure time. A remote object is said to be proximate to the subject vehicle 101 when the remote object can be detected by one or more of the sensing devices. The spatial monitoring system 116 preferably determines a linear range, relative speed, and trajectory of each proximate remote object and communicates such information using the communication controller 19. The sensing devices are situated on the subject vehicle 101, and include front corner sensors 121, rear corner sensors 120, rear side sensors 120', side sensors 129, and front radar sensor 122, and a camera 123 coupled to the vehicle body 103, although the disclosure is not so limited. Preferably, the camera 123 includes a monochrome vision camera used for detecting forward lane markings. The front radar sensor 122 preferably includes a long-range radar device for object detection in front of the subject vehicle 101. The front radar sensor 122 preferably detects objects at a distance up to 200 meters with a narrow field of view angle of around 15° in one embodiment. Due to the narrow field of view angle, the long-range radar may not detect all objects in the front of the subject vehicle 101. The front corner sensors 121 preferably include short-range radar devices to assist in monitoring the region in front of the subject vehicle 101, each having a 60° field of view angle and 40 meters detection range in one embodiment. The side sensors 129, rear corner sensors 120 and rear side sensors 120' preferably include short-range radar devices to assist in monitoring oncoming traffic beside and behind the subject vehicle 101, each having a 60° field of view angle and 40 meters detection range in one embodiment. Placement of the aforementioned sensors permits the spatial monitoring system 116 to monitor traffic flow including proximate object vehicles and other objects around the subject vehicle 101. Data generated by the spatial monitoring system 116 may be employed by lane mark detection processor 74 to estimate the roadway.

Alternatively, the sensing devices can include object-locating sensing devices including range sensors, such as FM-CW (Frequency Modulated Continuous Wave) radars, pulse and FSK (Frequency Shift Keying) radars, and Lidar (Light Detection and Ranging) devices, and ultrasonic devices which rely upon effects such as Doppler-effect measurements to locate forward objects. The possible object-locating devices include charged-coupled devices (CCD) or complementary metal oxide semi-conductor (CMOS) video image sensors, and other camera/video image processors which utilize digital photographic methods to 'view' forward objects including one or more object vehicle(s). Such sensing systems are employed for detecting and locating objects in automotive applications and are useable with systems including adaptive cruise control, collision avoidance, and side-object detection.

The sensing devices are preferably positioned within the subject vehicle 101 in relatively unobstructed positions. It is also appreciated that each of these sensors provides an estimate of actual location or condition of an object, wherein said estimate includes an estimated position and standard deviation. As such, sensory detection and measurement of object locations and conditions are typically referred to as 'estimates.' It is further appreciated that the characteristics of these sensors are complementary, in that some are more reliable in estimating certain parameters than others. Sensors can have different operating ranges and angular coverages capable of estimating different parameters within their operating ranges. For example, radar sensors can usually estimate range, range rate and azimuth location of an object, but are not normally robust in estimating the extent of a detected object. A camera with vision processor is more robust in estimating a shape and azimuth position of the object but is less efficient at estimating the range and range rate of an object. Scanning type lidar sensors perform efficiently and accurately with respect to estimating range, and azimuth position, but typically cannot estimate range rate, and are therefore not as accurate with respect to new object acquisition/recognition. Ultrasonic sensors are capable of estimating range but are generally incapable of estimating or computing range rate and azimuth position. Further, it is appreciated that the performance of each sensor technology is affected by differing environmental conditions. Thus, some sensors present parametric variances during operation, although overlapping coverage areas of the sensors create opportunities for sensor data fusion.

The vehicle monitoring system 115 preferably includes a plurality of on-board chassis monitoring sensing systems and devices for monitoring vehicle operation to determine vehicle motion states that are communicated to the communication bus 127. The vehicle motion states preferably include, e.g., vehicle speed, steering angle of the steerable front wheels 160, and yaw rate. The on-board chassis monitoring sensing systems and devices include inertial sensors, such as rate gyros and accelerometers. The vehicle monitoring system 115 estimates the vehicle motion states, such as longitudinal speed, yaw-rate and lateral speed, and estimates lateral offset and heading angle of the subject vehicle 101. The measured yaw rate is combined with steering angle measurements to estimate the vehicle state of lateral speed. The longitudinal speed may be determined based upon signal inputs from wheel speed sensors arranged to monitor each of the front wheels 160 and rear wheels 170. The vehicle monitoring system 115 generates signals associated with the vehicle motion states that can be monitored by other vehicle control systems for vehicle control and operation.

The PCM 125 communicates with and is operatively connected to a vehicle powertrain (not shown) and executes control routines to control operation of an engine, a transmission and other torque machines, none of which are shown, to transmit tractive torque to the vehicle wheels in response to vehicle operating conditions and operator inputs. The PCM 125 is shown as a single control module but can include a plurality of controller devices operative to control various powertrain actuators, including the engine, transmission, torque machines, wheel motors, and other elements of a hybrid powertrain system, none of which are shown. The PCM 125 may include control routines in the form of algorithmic code to operate the adaptive cruise control system (ACC) 126 that controls vehicle braking and acceleration in response to operator control inputs that are detected using a human-machine interface (HMI) controller 124, including autonomous control of vehicle braking and acceleration to control vehicle speed and acceleration under predetermined conditions.

The VCM 128 communicates with and is operatively connected to a plurality of vehicle operating systems and executes control routines to control operation thereof. The vehicle operating systems preferably include braking, stability control, and steering systems. The vehicle operating systems can also include other systems, e.g., HVAC, entertainment systems, communication systems, and anti-theft systems. The VCM 128 is shown as a single control module but can include a plurality of controller devices operative to monitor systems and control various vehicle actuators. The VCM 128 includes the steering controller (STRG) 146 for vehicle lateral motion control. The steering controller 146 preferably includes an electrical power steering system (EPS) coupled with an active front steering system to augment or supplant operator input through a steering wheel 108 by controlling steering angle of the steerable wheels 160 during execution of an autonomic maneuver such as a lane change maneuver. An exemplary active front steering system permits primary steering operation by the vehicle operator including augmenting steering wheel angle control when appropriate to achieve a desired steering angle and/or vehicle yaw angle. It is appreciated that the control methods described herein are applicable with modifications to vehicle steering control systems such as electrical power steering, four/rear wheel steering systems, and direct yaw control systems that control traction of each wheel to generate a yaw motion.

The passenger compartment of the subject vehicle 101 allows a vehicle operator to interact with the steering wheel 108, which is mounted on a steering column 109. An input device 110 may be mechanically mounted on the steering column 109 and may communicate with the HMI controller 124. Alternatively, the input device 110 can be mechanically mounted proximate to the steering column 109 in a location that is convenient to the vehicle operator. The input device 110, shown herein as a stalk projecting from column 109, includes an interface device by which the vehicle operator may command vehicle operation in an autonomic control mode, e.g., by commanding activation of one or more of the autonomic vehicle control systems. The mechanization of the input device 110 is illustrative. One of ordinary skill in the art understands that the input device 110 may be mechanized in any one or more of a plurality of devices or may be in the form of a controller that is voice-activated or may be other suitable system. The input device 110 preferably has control features and a location that is used by present turn-signal activation systems. Alternatively, other input devices, such as levers, switches, buttons, and voice recognition input devices can be used in place of or in addition to the input device 110.

The HMI controller 124 monitors operator requests and provides information to the operator including status of vehicle systems, service and maintenance information. The HMI controller 124 communicates with and/or controls operation of a plurality of operator interface devices, wherein the operator interface devices are capable of transmitting a message associated with operation of one of the autonomic vehicle control systems, including a message urging operator action. The HMI controller 124 preferably also communicates with one or more devices that monitor biometric data associated with the vehicle operator, including, e.g., eye gaze location, posture, and head position tracking, among others. The HMI controller 124 is depicted as a unitary device for ease of description but may be configured as a plurality of controllers and associated sensing devices in an embodiment of the system described herein.

The HMI controller 124 communicates with the communication bus 127, and thus communicates with other controllers in the subject vehicle 101. The HMI controller 124 is configured to monitor a signal output from the input device 110, detect an activation signal from the vehicle operator based upon the signal output from the input device 110, and communicate the activation signal to the communication bus 127. The HMI controller 124 is configured to monitor operator inputs to the steering wheel 108, an accelerator pedal and a brake pedal, among other operator inputs. Operator interface devices that are capable of transmitting a message urging operator action can include an electronic visual display module, e.g., a liquid crystal display (LCD) device 133, a heads-up display (HUD) (not shown), an audio feedback device 132, a wearable device 131 and a haptic seat 130. The operator interface devices that are capable of urging operator action are preferably controlled by or through the HMI controller 124.

The other operator interface devices may operate as follows. The HUD may project information that is reflected onto an interior side of a windshield of the vehicle, in the field of view of the operator, including transmitting a confidence level associated with operation of one of the autonomic vehicle control systems. The HUD may also provide augmented reality information, such as lane location, vehicle path, directional and/or navigational information, and the like. HUD and related systems are known to those skilled in the art. The haptic seat 130 may include vibration capabilities that vary in frequency, velocity, modulation, and or intensity. The audio feedback device 132 may include sound capability that varies in frequency, velocity, modulation, and/or intensity. The wearable device 131 may include vibration capabilities that vary in frequency, velocity, modulation, and or intensity.

The subject vehicle 101 includes a communication controller 19 that has a wireless telematics communication system capable of vehicle communications, including communicating with a communication network 210 having wireless and wired communication capabilities. The communication network 210 may include satellites 211 and antennas 213. The communication controller 19 may include a wireless telematics communication system capable of extra-vehicle communications that includes short-range vehicle-to-vehicle (V2V) communication. Alternatively or in addition, the communication controller 19 has a wireless telematics communication system capable of short-range wireless communication to a handheld device 19A, e.g., a cell phone, a satellite phone or another telephonic device. In one embodiment, the handheld device 19A is loaded with a software application that includes a wireless protocol to communicate with the communication controller 19, and the handheld device 19A executes the extra-vehicle communication, including communicating with a remote server 220 via a communication network 210. The subject vehicle 101 may also include a global positioning system 15 and a navigation system 17, which may be employed to define a geographic location of the subject vehicle 101.

In one embodiment, there is an intelligent highway system that is configured to monitor locations, speeds and trajectories of a plurality of vehicles. In one embodiment, the subject vehicle 101 is configured to communicate with the communication network 210, including communicating between the intelligent highway system and the subject vehicle 101. This can include communicating geographic location, forward velocity and acceleration rate of one or more vehicles in relation to the subject vehicle 101. In one embodiment, the subject vehicle 101 is configured to communicate with the remote server 220 via the communication network 210.

The terms controller, control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, e.g., high-speed local area network communication bus 127, a wireless link or other suitable communication link. Communication includes exchanging data signals in other suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term 'signal' refers to a physically discernible indicator that conveys information, and may be various suitable waveform (e.g., electrical, optical, magnetic, mechanical or electromagnetic), such as DC, AC, sinusoidal-wave, triangular-wave, square-wave, vibration, and the like, that is capable of traveling through a medium. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

As used in this specification and claims, the terms 'for example,' 'for instance,' 'such as,' and 'like,' and the verbs 'comprising,' 'having,' 'including,' and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

Figure 2:
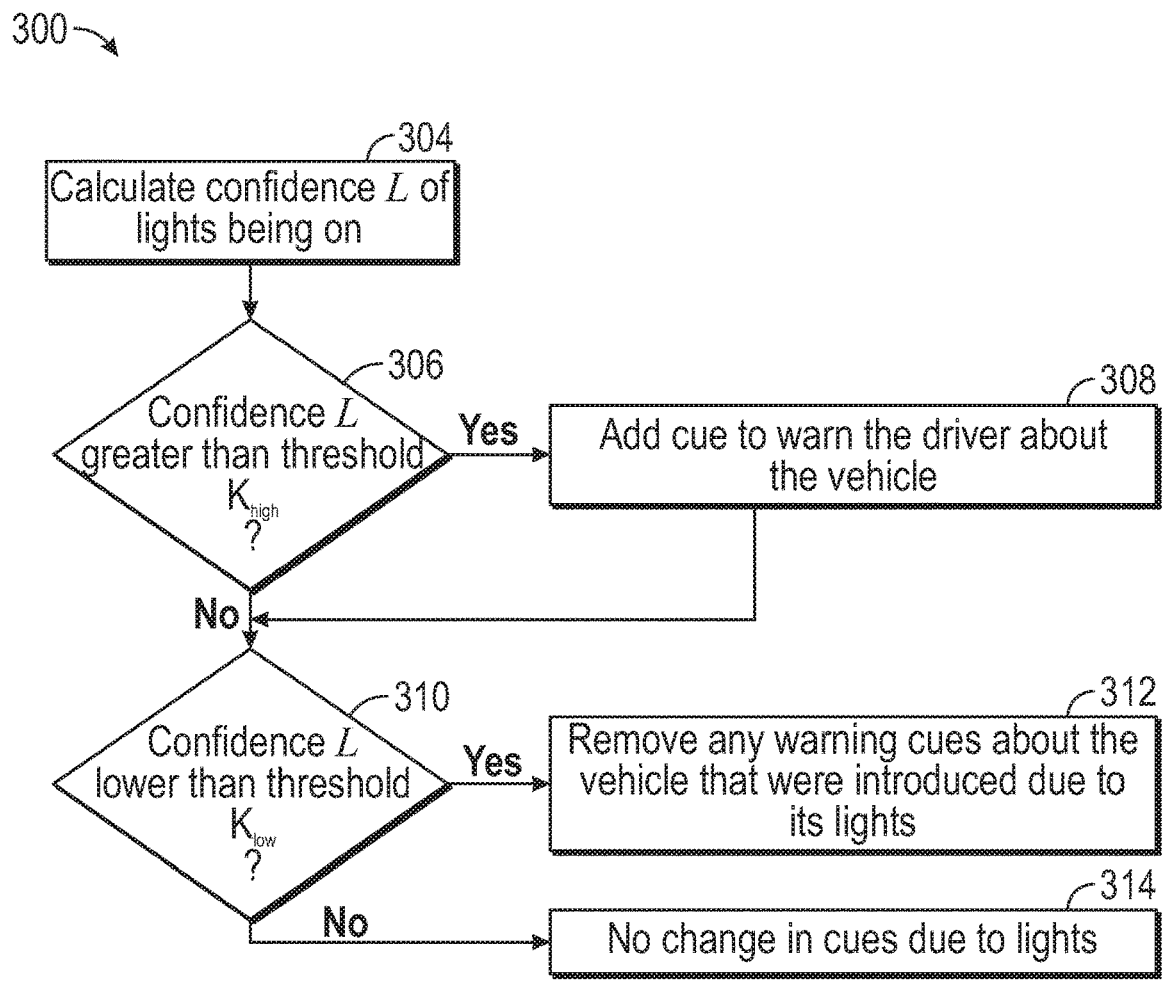
FIG. 2 is a flowchart of a method for providing warning cues to an operator of a vehicle using images collected by the camera.

FIG. 2 schematically shows a method 300 to provide warning cues to the operator of subject vehicle 101 behavior using information from the lights 402 of other vehicles 400. Preferably, the method 300 regularly and periodically executes during vehicle operation and is designed for use in manually driven vehicles (e.g., the subject vehicle 101). Some or all of the steps of the method 300 may be executed in the remote server 220.

Execution of the method 300 may proceed as follows. The steps of the method 300 may be executed in any suitable order, and are not limited to the order described with reference to FIG. 2. During vehicle operation, at block 304, the spatial monitoring controller 117 is in communication with the camera 123 and detects whether the state of the lights 402 (e.g., rear and/or brake lights) of other vehicles 400 (e.g., a parked vehicle) in terms of Confidence L using the camera 123 or other suitable vision sensor. To do so, the camera 123 captures an image of the other vehicle 400. Also, at block 304, the spatial monitoring controller 117 determines whether the lights 402 of the other vehicle 400 are ON or OFF in terms of Confidence L using the data (e.g., image) collected from the camera 123.

At block 304 the spatial monitoring controller 117 executes an algorithm to determine (e.g., calculate) and monitor the confidence level related to the determination of the state of the lights 402 of the other vehicle 400 are ON. Specifically, the spatial monitoring controller 117 determines and continuously monitors the confidence level that the lights 402 of at least one of the other vehicles 400 are ON. In the present disclosure "the confidence level that the lights 402 of at least one of the other vehicles 400 are ON" is herein referred to as Confidence L and is an indication, preferably in the form of a numerical value that conveys a measure of certainty or uncertainty that the lights 402 of the other vehicle 400 are ON based upon the information (e.g., images) collected by the camera 123. The confidence level may be a numerical value that is continuously variable over a range between −1 and 1. For example, the confidence level may be determined based upon a statistical probability using a suitable machine learning method. For example, a Neural Network can be trained to classify lights ON vs. OFF. In this case, the output of the net can simply be two numbers between −1 and 1 that represent the confidence values L (for the cases of any lights' being ON). More specifically, one example of a simple neural network executes the following calculations:

$$L = \tan h(A\_1 x + B\_1)$$

where x represents a vector obtained by concatenating Red-Green-Blue (RGB) values for all pixels in the image captured by the camera 123; and A_1, and B_1 are matrices and vectors of appropriate dimensions with their values found through training the neural net.

After determining (e.g., calculating) the Confidence L, the method 300 proceeds to block 306. At block 306, the spatial monitoring controller 117 determines whether the Confidence L is greater than a first predetermined threshold $K_{high}$. In response to determining that the Confidence L is greater than the first predetermined threshold $K_{high}$, the method 300 continues to block 308.

Figure 3:
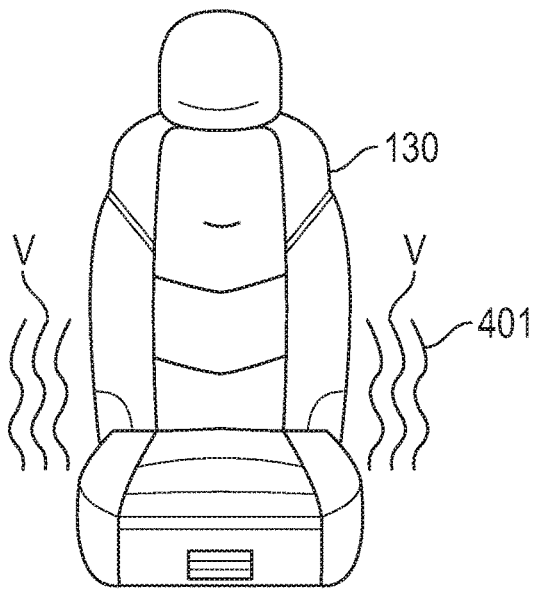
FIG. 3 is a schematic front view of a haptic seat of the subject vehicle schematically illustrated in FIG. 1.
Figure 4:
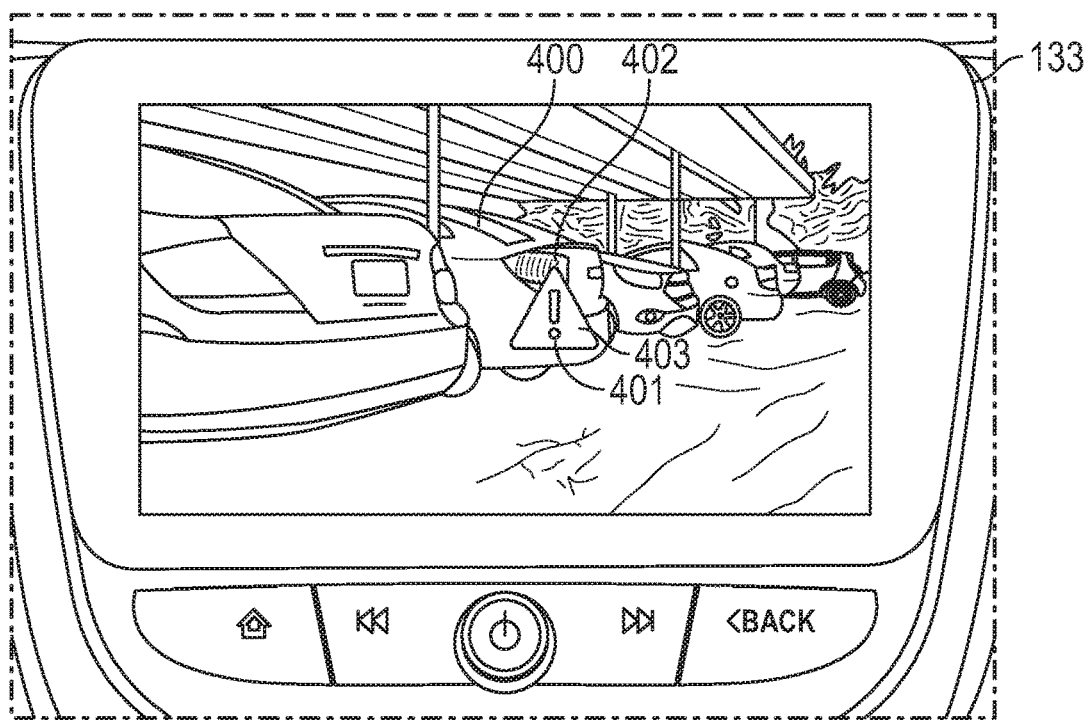
FIG. 4 is a schematic front view of a display device showing an image captured by the camera of the subject vehicle schematically illustrated in FIG. 1.
Figure 5:
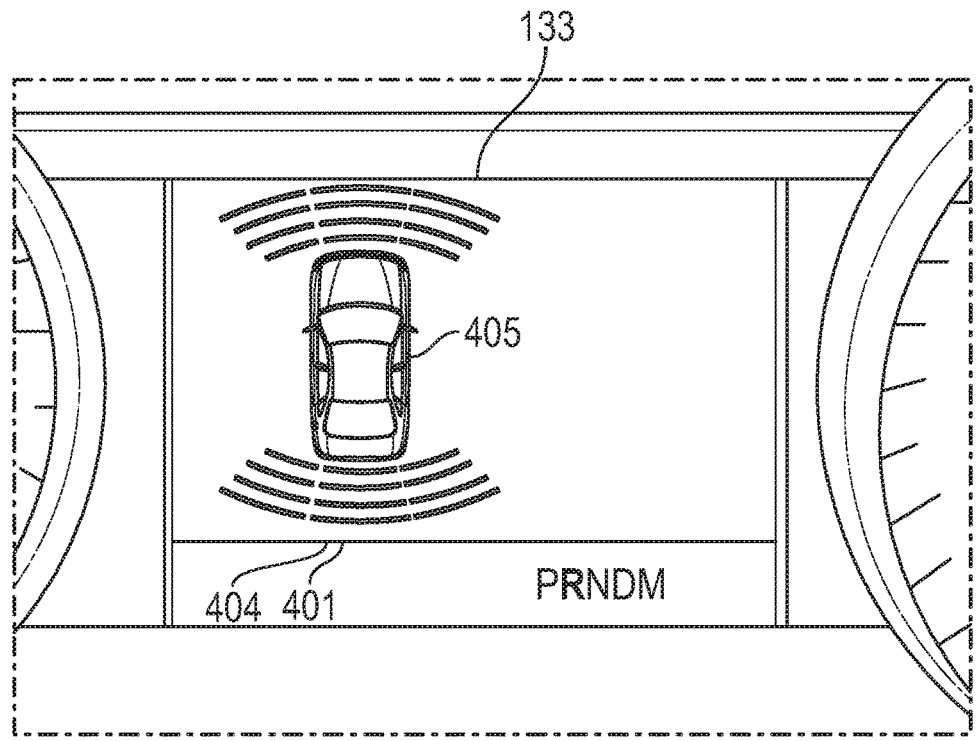
FIG. 5 is a schematic front view of a display device showing a visual warning light around a schematic vehicle diagram.

At block 308, the spatial monitoring controller 117 activates an alarm 401 of the subject vehicle 101 in response to determining that the Confidence L is greater than the first predetermined threshold $K_{high}$ in order to provide the vehicle operator a warning cue about the other vehicle 400. The first predetermined threshold $K_{high}$ may be 65% in order to active the alarm 401 solely when the spatial monitoring controller 117 is relatively certain that the lights 402 of the other vehicle 400 are ON. The alarm 401 serves as a cue to warn the vehicle operator that the other vehicle 400 is about to (or is currently) back out of a parking spot. The alarm 401 (or cues) may be provided in the form of sounds, warning signals displayed on a display device 133, the HUD or other suitable visual display system, haptic feedback from the haptic seat 130, among others. For example, as shown in FIG. 3, the haptic seat 130 can provide a haptic feedback (vibration V) to warn the vehicle operator that the other vehicle 400 is about to back out of the parking spot. Alternatively or additionally, as shown in FIG. 4, the display screen 133 may reproduce the image captured by the camera 123 and add a warning symbol 403 on the image of the other vehicle 400 that has the lights 402 ON (and is about to move from the parking spot). Additionally or alternatively, as shown in FIG. 5, the display screen 133 may provide a visual warning light 404 around a schematic vehicle diagram 405. Thus, as non-limiting examples, the alarm 401 may be repressed by the warning symbol 403 displayed on the display device 133, the haptic feedback (e.g., vibration) produced by the haptic seat 130, and/or the visual warning light 404 displayed around the schematic vehicle diagram 405 displayed on the display device 133. After executing block 308, the method 300 proceeds to block 310.

Returning to block 306, in response to determining that the Confidence L is not greater than the first predetermined threshold $K_{high}$, the method 300 continues to block 310. At block 310, the spatial monitoring controller 117 determines whether the Confidence L is less than a second predetermined threshold $K_{low}$. The first predetermined threshold is greater than or equal to the second predetermined threshold in order to allow the spatial monitoring controller 117 to add warning cues solely when the certainty that the lights 402 of the other vehicle 400 are ON is relatively high and to remove warning cues solely when the certainty that the lights 402 of the other vehicle 400 is relatively low. In response to determining that the Confidence L is less than the second predetermined threshold $K_{low}$, the method 300 proceeds to block 312.

At block 312, the spatial monitoring controller 117 removes any warning cues about the other vehicle 400 that were introduced due to its lights 402 being ON in response to determining that the Confidence L is less than the second predetermined threshold $K_{low}$. The second predetermined threshold $K_{low}$ may be 50% in order to deactivate the alarm 401 solely when there is relatively uncertainty about whether the lights 402 of the other vehicle 40 are ON. In other words, in response to determining that the Confidence L is less than the second predetermined threshold $K_{low}$, the spatial monitoring controller 117 deactivates the alarm 401. As non-limiting examples, the warning symbol 403 may be removed from the display device 133, the haptic feedback V (e.g., vibration) may be deactivated by the haptic seat 130, and/or the visual warning light 404 displayed around the schematic vehicle diagram 405 may be turned OFF.

Returning to block 310, in response to determining that the Confidence L is not less than the second predetermined threshold $K_{low}$, the method 300 proceeds to block 314. At block 314, no changes in cues due to the lights 402 are made. In other words, at block 314, the alarm 401 remains activated or remains inactive if it was inactive before.

Figure 6:
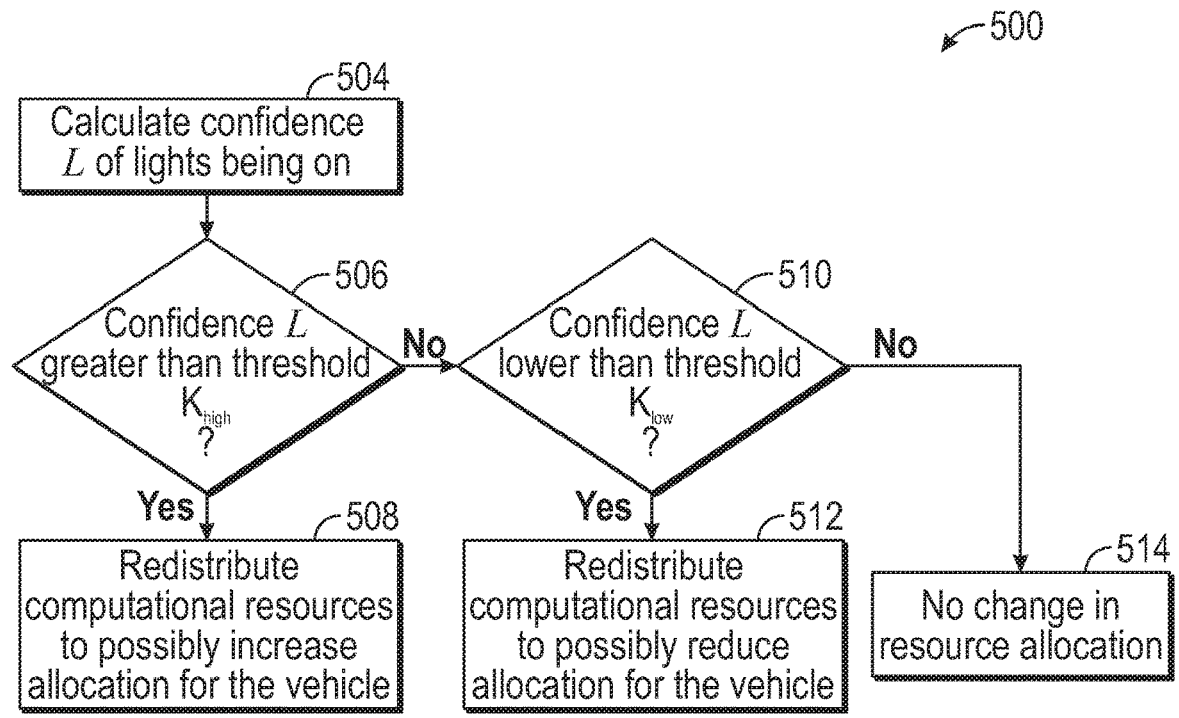
FIG. 6 is a flowchart of a method for controlling an autonomous vehicle using images collected by the camera.

With reference to FIG. 6, a method 500 can be used in an autonomous vehicle (e.g., the subject vehicle 101) and allows the subject vehicle 101 to be more cautious (i.e., more alert) while passing a vehicle (i.e., other vehicle 400) with lights 402 that are ON. The method 500 begins at block 504. During vehicle operation, at block 504, the spatial monitoring controller 117 detects whether the state of the lights 402 (e.g., rear and/or brake lights) of other vehicles 400 in terms of Confidence L (e.g., a parked vehicle) using the camera 123 or other suitable vision sensor. To do so, the camera 123 captures an image of the other vehicle 400. Also, at block 504, the spatial monitoring controller 117 determines whether the lights 402 of the other vehicle 400 (or other vehicles 400) are ON or OFF in terms of Confidence L using the data (e.g., images) collected from the camera 123.

At block 504, for every vehicle 400, the spatial monitoring controller 117 executes an algorithm to determine (e.g., calculate) and monitor the confidence level related to the determination of the state of the lights 402 of the other vehicle 400 are ON as discussed above with respect to step 304. As discussed above, "the confidence level that the light 402 of at least one of the other vehicles 400 are ON" is herein referred to as Confidence L and is an indication, preferably in the form of a numerical value that conveys a measure of certainty or uncertainty that the light 402 of the other vehicle 400 are ON based upon the information (e.g., images) collected by the camera 123. Then, the method 500 continues with block 506.

After determining (e.g., calculating) the Confidence L, the method 500 proceeds to block 506. At block 506, the spatial monitoring controller 117 determines whether the Confidence L is greater than the first predetermined threshold $K_{high}$. In response to determining that the Confidence L is greater than the first predetermined threshold $K_{high}$, the method 500 continues to block 508.

At block 508, the spatial monitoring controller 117 redistributes its computational resources to increase the allocation of the computational resources of the spatial monitoring controller 117 used to visually analyze the other vehicle(s) 400. The allocation of computation resources may depend on factors, such as: (a) the number of other vehicles 400 that are within the field of view of the camera 123; (b) the confidence in lights being ON ("Confidence L") for each detected vehicle; (c) distance and size of all the detected vehicles, etc. An increase in the allocation of computational resources may involve: (a) using neural networks that rely on more computational power with higher resolution, and/or (b) using more sophisticated algorithms (e.g., semantic segmentation). Semantic segmentation may include useful information such as the state of the vehicle (e.g., door/trunk open, etc.) and even pedestrians closer to the other vehicle 400.

Returning to block 506, in response to determining that the Confidence L is not greater than the first predetermined threshold $K_{high}$, the method 500 continues to block 510. At block 510, the spatial monitoring controller 117 determines whether the Confidence L is less than the second predetermined threshold $K_{low}$. In response to determining that the Confidence L is less than the second predetermined threshold $K_{low}$, the method 500 proceeds to block 512.

At block 512, the spatial monitoring controller 117 redistributes its computational resources to decrease the allocation of the computational resources of the spatial monitoring controller 117 used to visually analyze the other vehicle 400. For example, if semantic segmentation is being used to analyze the other vehicle 400, the spatial monitoring controller 117 may use a simpler method to visually analyze the other vehicle 400 instead of the semantic segmentation method.

Returning to block 510, in response to determine that the Confidence L is not less than the second predetermined threshold $K_{low}$, the method 500 continues to block 514. At block 514, no change in computational resource allocation occurs. In other words, at block 514, the spatial monitoring controller 117 does not increase or decrease its computation resources used to visually analyze the other vehicle 400.

Figure 7:
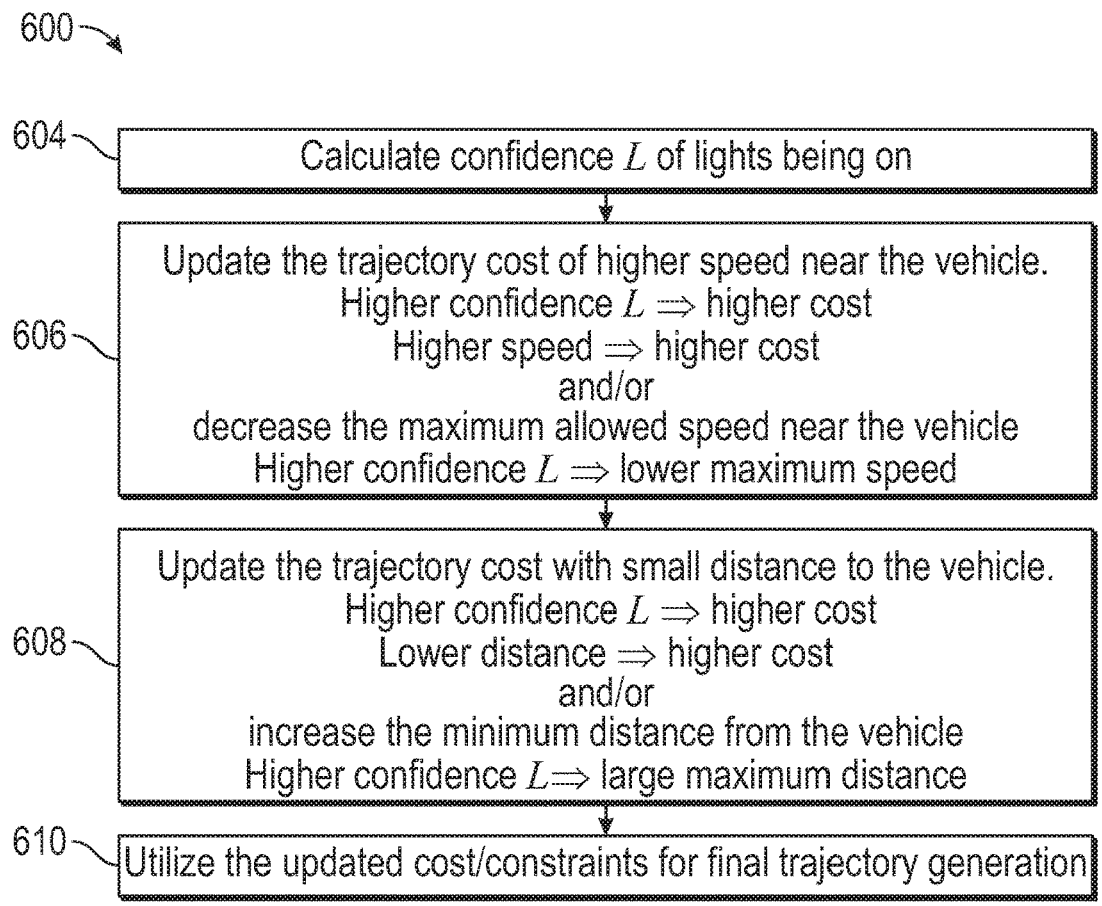
FIG. 7 is a flowchart of a method for controlling an autonomous vehicle using images collected by the camera.

With reference to FIG. 7, the method 600 can be used in an autonomous vehicle (e.g, the subject vehicle 101) and allows the subject vehicle 101 to maintain a predetermined distance while passing a vehicle (i.e., the other vehicle 400) with lights 402 that are ON. The method 600 begins at block 604. During vehicle operation, at block 604, the spatial monitoring controller 117 detects whether the state of the lights 402 (e.g., rear and/or brake lights) of other vehicles 400 in terms of Confidence L (e.g., a parked vehicle) using the camera 123 or other suitable vision sensor. To do so, the camera 123 captures an image of the other vehicle 400. Also, at block 604, the spatial monitoring controller 117 determines whether the lights 402 of the other vehicle 400 (or other vehicles 400) are ON or OFF in terms of Confidence L using the data (e.g., images) collected from the camera 123.

At block 604, for every vehicle 400, the spatial monitoring controller 117 executes an algorithm to determine (e.g., calculate) and monitor the confidence level related to the determination of the state of the lights 402 of the other vehicle 400 are ON as discussed above with respect to block 304. As discussed above, "the confidence level that the lights 402 of at least one of the other vehicles 400 are ON" is herein referred to as Confidence L and is an indication, preferably in the form of a numerical value that conveys a measure of certainty or uncertainty that the lights 402 of the other vehicle 400 are ON based upon the information (e.g., images) collected by the camera 123. Then, the method 600 continues with block 606.

At block 606, the spatial monitoring controller 117 updates a trajectory cost of the subject vehicle 101. In the present disclosure, the term "trajectory cost" means a value associated with a particular trajectory to be taken by the subject vehicle. During operation of the subject vehicle 101, the trajectory cost is used to generate the final trajectory of the subject vehicle 101. It is desirable to generate a final trajectory with the lowest possible trajectory costs. At block 606, the spatial monitoring controller 117 updates the trajectory costs based on the speed of the dictated by the trajectory and the Confidence L determined in block 604. The trajectory costs will be updated solely for those trajectories that go close to the vehicle 400. In particular, the spatial monitoring controller 117 increasing the trajectory cost as a function of the speed of dictated by the trajectory, wherein the increase in the trajectory cost is proportional to the speed dictated by the trajectory. Thus, the higher the speed, the higher the trajectory cost will be. In addition, the spatial monitoring controller 117 increases the trajectory cost as a function of the Confidence L, wherein the increase in the trajectory cost is proportional to the Confidence L. Thus, the higher the Confidence L, the higher the trajectory cost will be. Additionally or alternatively, at block 606, the spatial monitoring controller 117 also updates the maximum allowed speed of the subject vehicle as a function of the Confidence L. The maximum allowed speed of the subject vehicle 101 is inversely proportional to the Confidence L. Thus, the higher the Confidence L, the lower the maximum allowed speed will be. Then, the method 600 proceeds to block 608.

At step 608, the spatial monitoring controller 117 determines the distance from a potential trajectory of the subject vehicle 101 to the other vehicle 400 (not the current distance from the vehicle 400 to the host vehicle) using, for example, data collected from Lidar devices. In particular, the spatial monitoring controller 117 increases the trajectory cost as a function of the distance from the subject vehicle 101 to the other vehicle 400 whose lights 402 are ON. The trajectories that go close to the vehicle 400 will have their cost increased. Specifically, the increase in the trajectory cost is inversely proportional to the distance from the potential trajectory of the subject vehicle 101 to the other vehicle 400 whose lights 402 are ON. Thus, the lower the distance from the subject vehicle 101 to the other vehicle 400, the higher the trajectory cost will be. Additionally or alternatively, also at block 608, the spatial monitoring controller 117 updates the minimum allowed distance from the subject vehicle 101 to the other vehicle 400 (whose lights 402 are ON) as a function of the Confidence L. The minimum allowed distance from the subject vehicle 101 to the other vehicle 400 (whose lights 402 are ON) is directly proportional to the Confidence L. Thus, the higher the Confidence L, the higher the minimum allowed distance from the subject vehicle 101 to the other vehicle 400 will be. Then, the method 600 continues to block 610.

At block 610, the spatial monitoring controller 117 determines a final trajectory of the subject vehicle 101 based on the trajectory cost, the maximum allowed speed of the subject vehicle 101, and the minimum allowed distance from the subject vehicle 101 to the other vehicle 400 (whose lights 402 are ON). Then, at block 610, the spatial monitoring controller 117 (or other suitable controller) controls the movement of the subject vehicle 101 based on the final trajectory. As such, the subject vehicle 101 follows the final trajectory FT (shown in FIG. 8).

Figure 8:
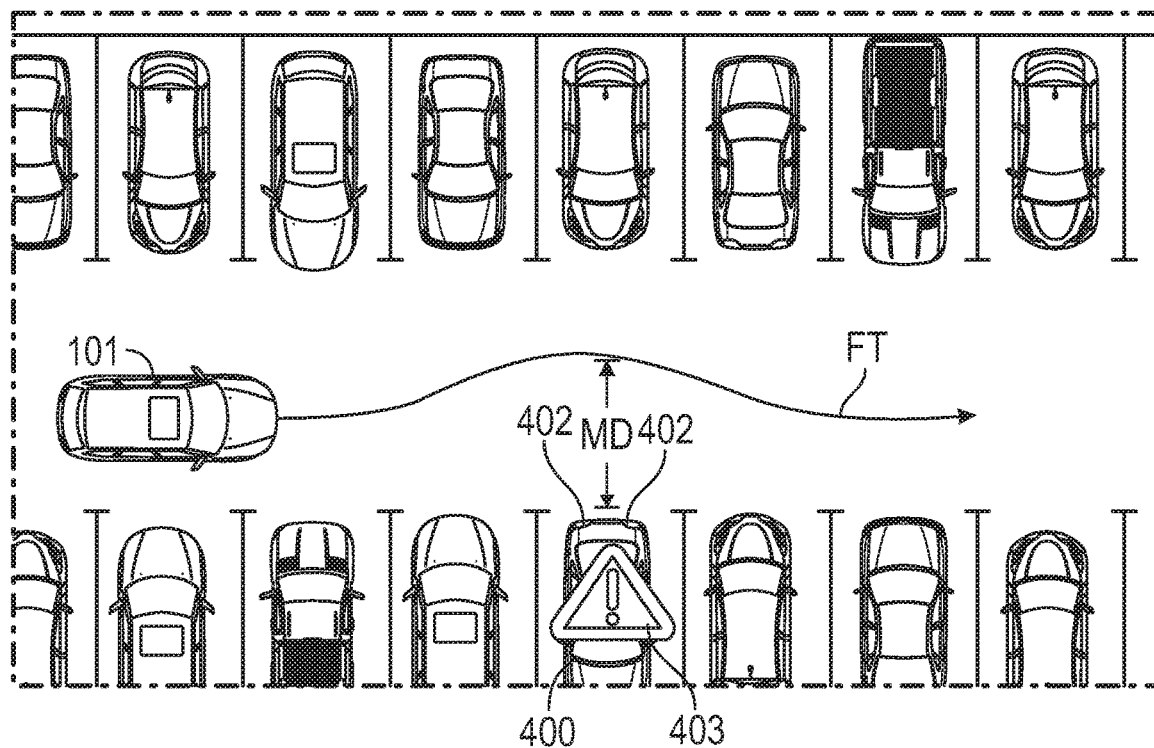
FIG. 8 is a schematic diagram showing an autonomous vehicle executing the method of FIG. 7.

For example, as shown in FIG. 8, the spatial monitoring controller 117 detects that the lights 402 are ON. Further, by using the method 600, the spatial monitoring controller 117 determines a final trajectory FT in which a minimum allowed distance MID from the subject vehicle 101 and the other vehicle 400 is maintained.

Figure 9:
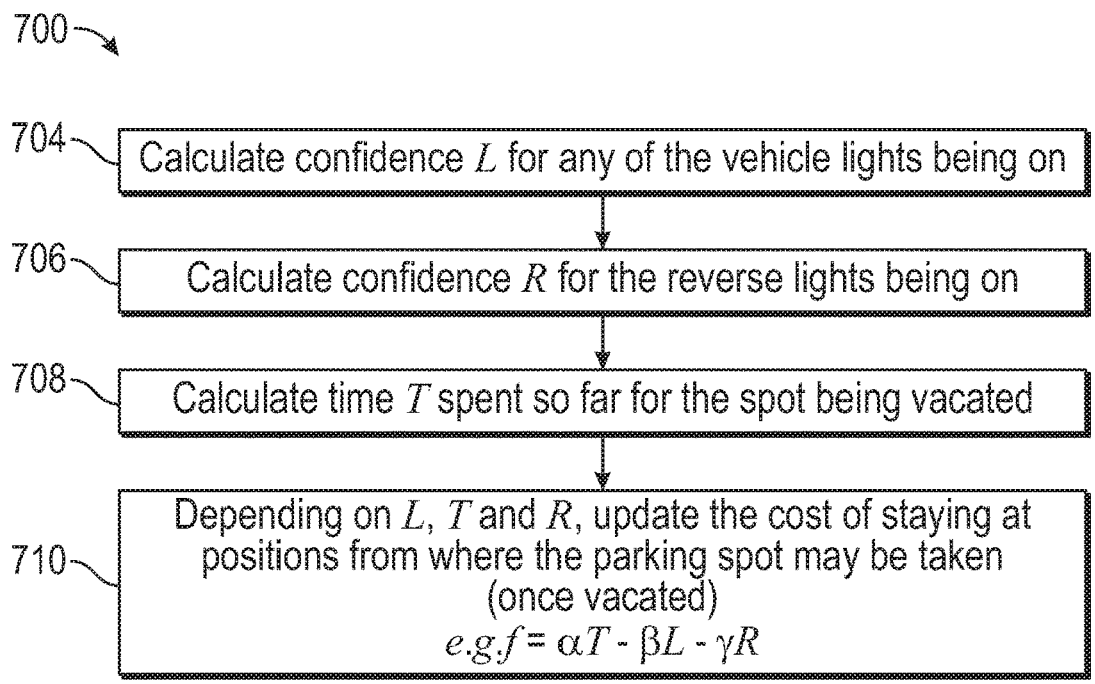
FIG. 9 is a flowchart of a method for controlling an autonomous vehicle that is searching for a parking spot.

With reference to FIG. 9, a method 700 can be used in an autonomous vehicle (e.g., the subject vehicle 101) and facilitates searching for a parking spot based on approaching one or more vehicles (i.e., the other vehicle 400) with lights 402 that are ON. The method 700 begins at block 704. During vehicle operation, at block 704, the spatial monitoring controller 117 detects whether the state of the lights 402 (e.g., rear and/or brake lights) of other vehicles 400 in terms of Confidence L (e.g., a parked vehicle) using the camera 123 or other suitable vision sensor. To do so, the camera 123 captures an image of the other vehicle 400. Also, at block 704, the spatial monitoring controller 117 determines whether the lights 400 of the other vehicle 400 in terms of Confidence L are ON or OFF using the data (e.g., images) collected from the camera 123.

At block 704, in response to determining the state of any vehicle lights 402 of at least one of the other vehicles 400, for every vehicle 400 with lights 402 that are ON, the spatial monitoring controller 117 executes an algorithm to determine (e.g., calculate) and monitor the Confidence L related to the determination of the state of any vehicle lights 402 of the other vehicle 400 are ON as discussed above with respect to block 304. As discussed above, "the confidence level that any vehicle lights 402 of at least one of the other vehicles 400 are ON" is herein referred to as Confidence L and is an indication, preferably in the form of a numerical value that conveys a measure of certainty or uncertainty that any vehicle lights 402 of the other vehicle 400 are ON based upon the information (e.g., images) collected by the camera 123. The Confidence L may be a numerical value that is continuously variable over a range between 0% and 100%. For example, the Confidence L may be determined based upon a statistical probability using a suitable machine learning method. For example, a Neural Network can be trained to classify lights ON vs. OFF. In this case, the output of the net can simply be two numbers between −1 and 1 that represent the confidence values L (for the cases of 'any lights' being ON). More specifically, one example of a simple neural network executes the following calculations:

$$L = \tan h(A\_1 x + B\_1)$$

where x represents a vector obtained by concatenating Red-Green-Blue (RGB) values for all pixels in the image captured by the camera 123; and A_1, and B_1 are matrices and vectors of appropriate dimensions with their values found through training the neural net.

After determining (e.g., calculating) the Confidence L, the method 700 proceeds to block 706.

At block 706, in response to determining the state of any vehicle lights 402 of the other vehicles 400, for every vehicle 400 with lights 402 that are ON, the spatial monitoring controller 117 executes an algorithm to determine (e.g., calculate) and monitor the confidence level R related to the determination of the state of reverse lights (e.g., lights 402) of the other vehicle 400 are ON as discussed above with respect to block 304. As discussed above, "the confidence level that the reverse lights (e.g., lights 402) of at least one of the other vehicles 400 are ON" is herein referred to as Confidence Level R and is an indication, preferably in the form of a numerical value that conveys a measure of certainty or uncertainty that the reverse lights (e.g., lights 402) of the other vehicle 400 are ON based upon the information (e.g., images) collected by the camera 123. The Confidence level R may be a numerical value that is continuously variable over a range between −1 and 1. For example, the Confidence R may be determined based upon a statistical probability using a suitable machine learning method. For example, a Neural Network can be trained to classify lights ON vs. OFF. In this case, the output of the net can simply be two numbers between −1 and 1 that represent the confidence values R (for the cases of any lights' being ON). More specifically, one example of a simple neural network executes the following calculations:

$$R = \tan h(A\_2x + B\_2)$$

where x represents a vector obtained by concatenating Red-Green-Blue (RGB) values for all pixels in the image captured by the camera 123; and A_2, and B_2 are matrices and vectors of appropriate dimensions with their values found through training the neural net.

After determining (e.g., calculating) the Confidence R, the method 700 proceeds to block 708.

At block 708, using its internal clock, the spatial monitoring controller 117 determines (e.g., measures) the time T spent so far waiting for the parking spot to be vacated. In order words, at block 708, the spatial monitoring controller 117 measures the time T (in seconds for example) that has lapsed from the moment that it detects the state of the lights 402 (e.g., rear and/or brake lights) of other vehicles 400, such as other vehicle 400 (e.g., a parked vehicle) using the camera 123 at block 704. Then, the method 700 continues to block 710.

At block 710, the spatial monitoring controller 117 updates a cost of staying at a position from where the parking spot may be taken (once vacated) as a function of Confidence L determined in block 704, the Confidence Level R determined in block 706, and the time T determined in block 710. As non-limiting example, at block 710 the spatial monitoring controller 117 may employ the following equation:

$$f = \alpha T - \beta L - \gamma R$$

where f is the cost of staying at a position from where the parking spot may be taken;

α, β, γ are weighting predetermined constants that can be adjusted based on the weight desired for each variable;

T is the time spent so far waiting for the parking spot to be vacated;

L is a measure of certainty that any vehicle lights 402 of the other vehicle 400 are ON; and R is a measure of certainty that the reverse lights (e.g., lights 402) of the other vehicle 400 are ON.

Figure 10:
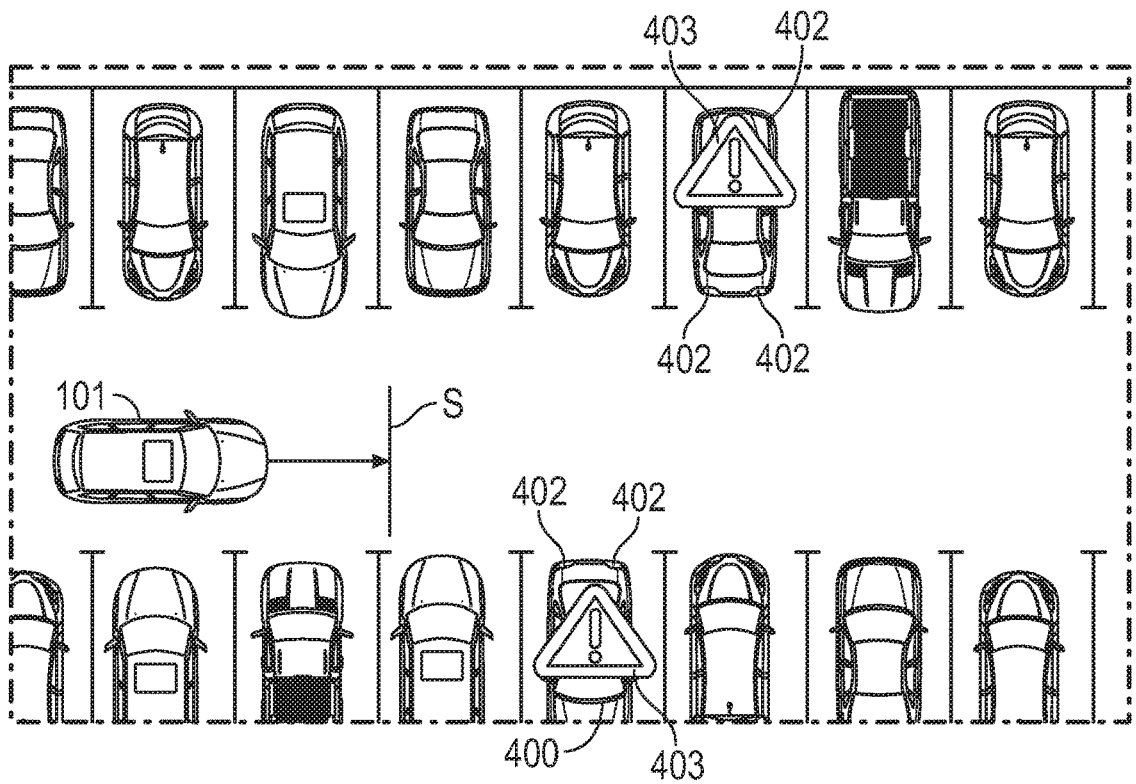
FIG. 10 is a schematic diagram illustrating how a spatial monitoring controller controls the movement of the subject vehicle based on the cost of staying at a position from where the parking spot may be taken.

Also at block 710, the spatial monitoring controller 117 controls the movement of the subject vehicle 101 based on the cost of staying at a position from where the parking spot may be taken. For example, as shown in FIG. 10, if no vehicles (e.g., other vehicles 400) leave the parking spot for a long period of time (i.e., time T), then the cost f will be relatively high due to a high time T. In response to the high cost f, the spatial monitoring controller 117 will command the subject vehicle 101 to leave and look for another parking spot. Also, if multiple vehicles with lights 402 that are ON are detected, then lowering of the cost f will make the subject vehicle 101 wait at a spot S (FIG. 10) from where any parking spot may be taken once the other vehicle 400 leaves the parking spot.

Figure 11:
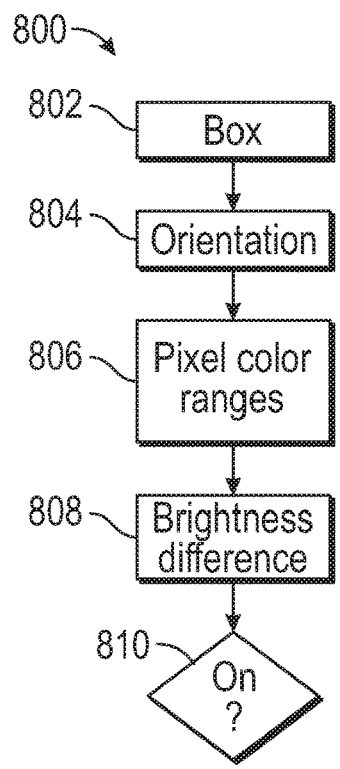
FIG. 11 is a flowchart of a method for determining the state of the lights of the other vehicle.
Figure 12:
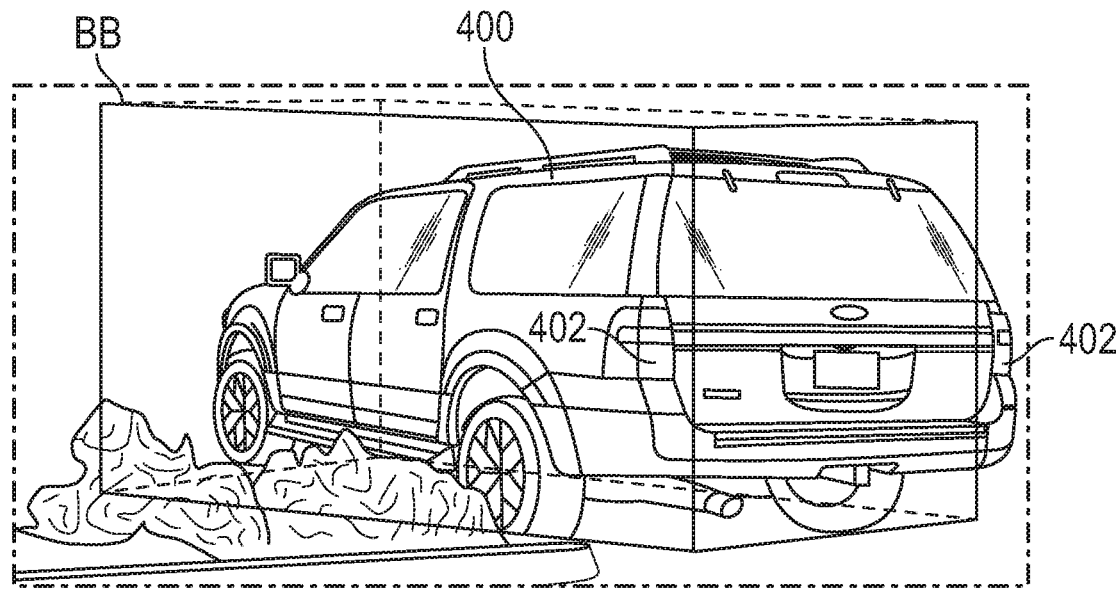
FIG. 12 is schematic illustration that shows how the method shown in FIG. 2 detects the lights on a vehicle.

With reference to FIGS. 11 and 12, a method for determining the state of the lights 402 of the other vehicle 400 is described. The method 800 employs neural network training using hand labeled data. In one embodiment, the method 800 begins at block 802, which entails bounding the other vehicle 400 (and other vehicle within the field of view of the camera 123) in a bounding box BB. The bounding box is a virtual box. Accordingly, the spatial monitoring controller 117 virtual bounds the other vehicle 400 within the image captured by the camera 123. Then, the method 800 proceeds to block 804.

At block 804, the spatial monitoring controller 117 uses the orientation of the other vehicle 400 to identify areas of interest as possible pixel locations for the lights 402 of the other vehicle 400. Then, the method 800 continues to block 806. At block 806, the spatial monitoring controller 117 searches, in the areas of interest, for pixel color ranges commonly found in the lights 402 of the other vehicle 400. The pixel color ranges commonly found in the lights 402 of the other vehicle 400 are herein referred to as the predetermined pixel color ranges, because these color pixel ranges are previously determined through statistical analysis. Thus, at block 804, the spatial monitoring controller 117 searches for the predetermined pixel color ranges in the areas of interest. Next, the method 800 continues to block 808.

At block 808, the spatial monitoring controller 117 searches for a difference in brightness between the areas of interest and a remaining area within the bounding box BB. Specifically, the spatial monitoring controller 117 determines whether the difference in brightness between the areas of interest and the remaining area within the bounding box is greater than a predetermined brightness threshold. Then, the method 800 proceeds to block 810.

At block 810, the spatial monitoring controller 117 determines that the lights 402 of the other vehicle 400 are ON solely when: (a) the predetermined color pixel ranges are found in the areas of interest and (b) the difference in brightness between the areas of interest and the remaining area within the bounding box BB is greater than a predetermined brightness threshold. For example, the spatial monitoring controller 117 determines that the lights 402 of the vehicle 400 are ON solely when the brightness in the areas of interest is relative higher than other areas within the bounding box BB and the pixels in the areas of interest have a reddish white color.

Figure 13:
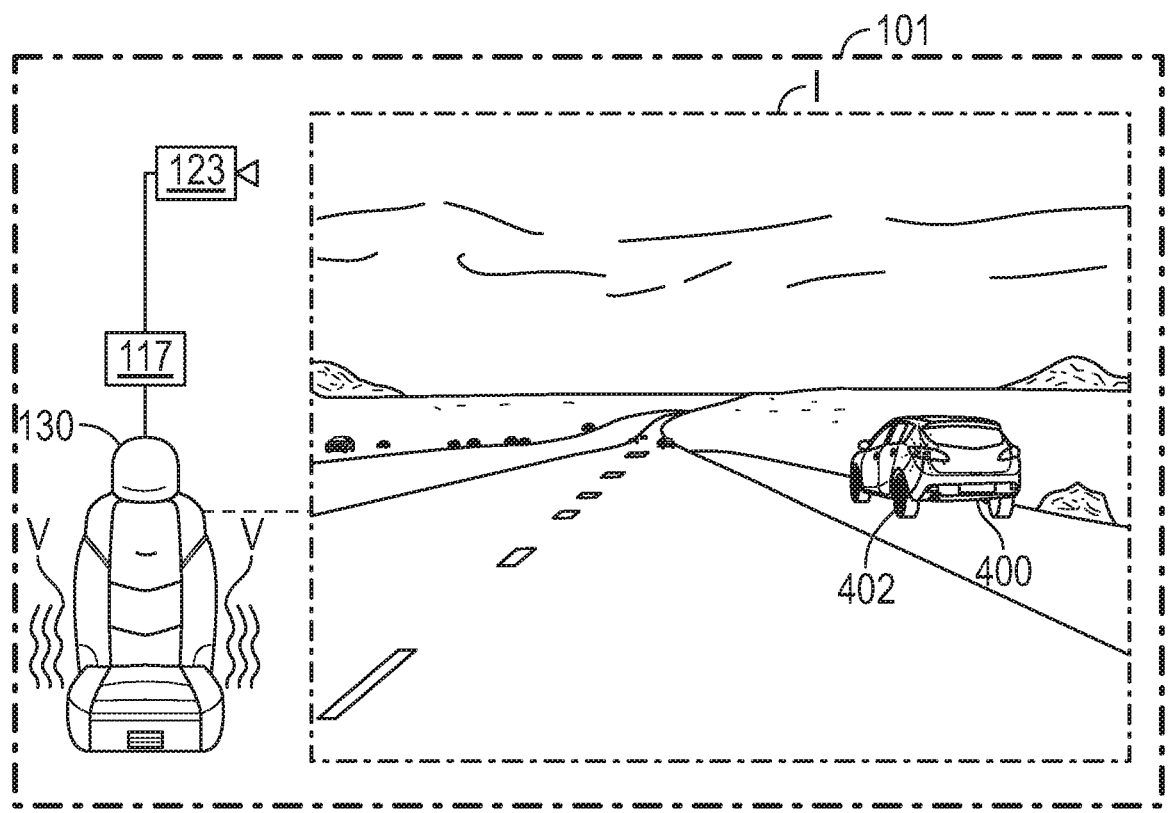
FIG. 13 is a schematic illustration of an example showing how the spatial monitoring controller executes a method to provide warning cues to the operator of subject vehicle using information from the lights of other vehicles.

With reference to FIG. 13, an example of the subject vehicle 101 executing the method 300 (described above with respect to FIG. 2) to provide warning cues to the operator of subject vehicle 101 using information from the lights 402 of other vehicles 400. In this example, the camera 123 captures an image I of another vehicle 400 with a turning signal light 402 that is ON. In response, the spatial monitoring controller 117 activates the haptic seat 130 to provide a haptic feedback V to the vehicle operator.

Figure 14:
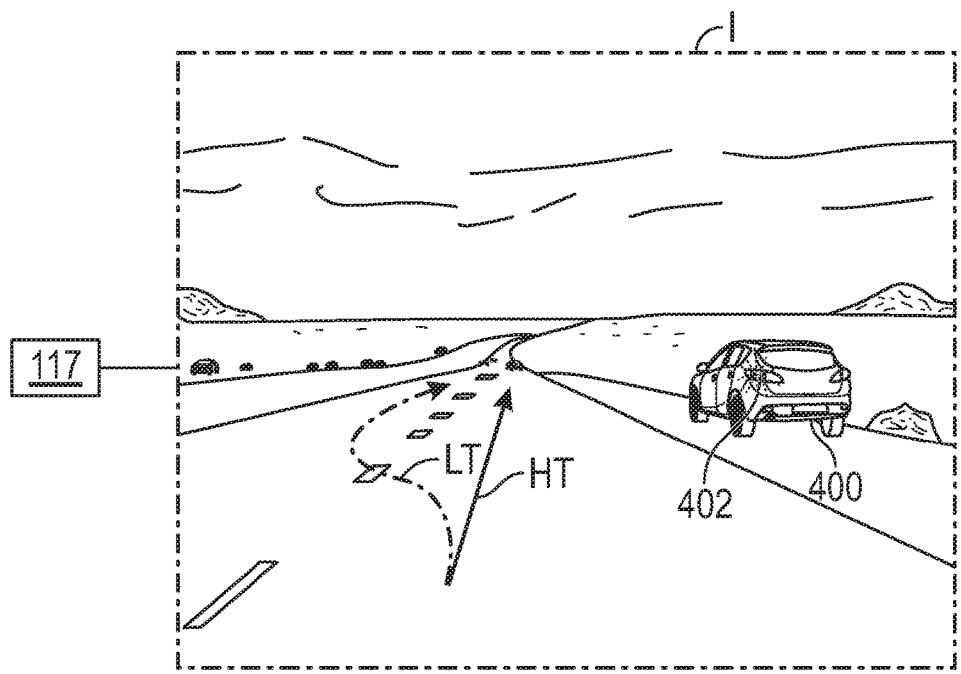

With reference to FIG. 14, an example of the execution of the method 600 for controlling an autonomous vehicle as described above with respect to FIG. 7 is described. In this example, based on the image I, the spatial monitoring controller 117 detects that the turn signal light 402 of the other vehicle 400 is ON. In response, the spatial monitoring controller 117 increases the trajectory cost for the trajectory entailing passing nearby the other vehicle (i.e., the high cost trajectory HT). Accordingly, the spatial monitor controller 117 commands the subject vehicle 101 to choose another trajectory (i.e., a low-cost trajectory LT), which may entail changing lanes away from the other vehicle 400.

Figure 15:
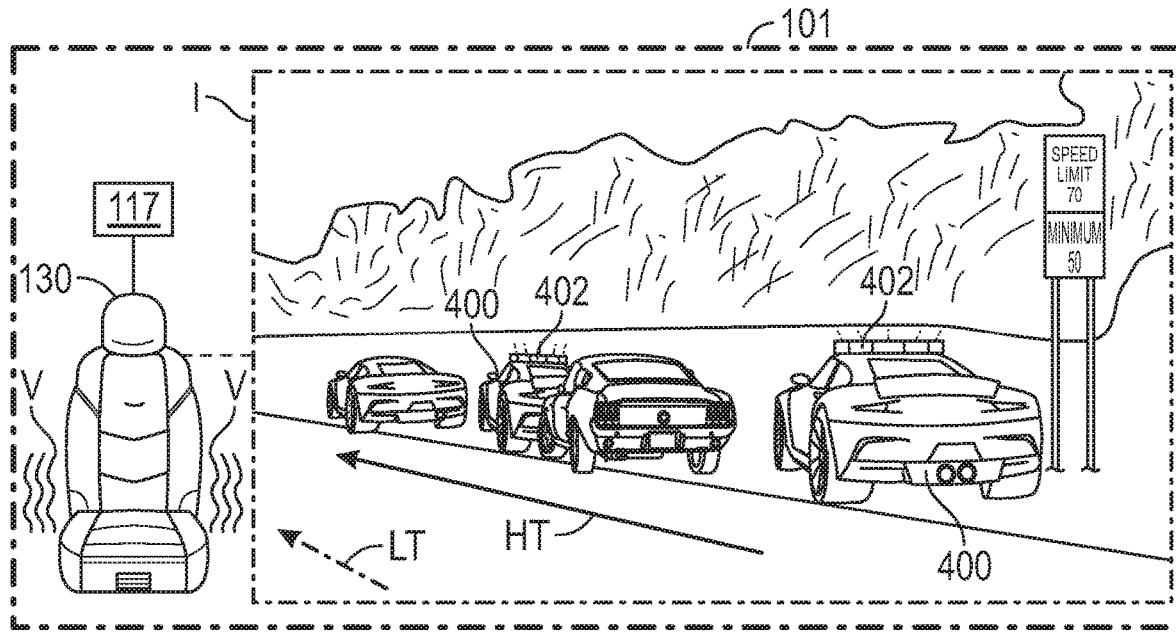

With reference to FIG. 15, an example of the execution of the method 600 for controlling an autonomous vehicle as described above with respect to FIG. 7 is described. In this example, based on the image I, the spatial monitoring controller 117 detects that the emergency lights 402 of a police car (i.e., the other vehicle 400) are ON. In response, the spatial monitoring controller 117 increases the trajectory cost for the trajectory entailing passing nearby the other vehicle (i.e., the high cost trajectory HT). Accordingly, the spatial monitor controller 117 commands the subject vehicle 101 to choose another trajectory (i.e., a low-cost trajectory LT), which may entail changing lanes away from the police car (i.e., other vehicle 400). FIG. 15 also shows an example of the subject vehicle 101 executing the method 300 (described above with respect to FIG. 2) to provide warning cues to the operator of a manual vehicle (i.e., the subject vehicle 101). In this example, the camera 123 captures an image I of a police car (i.e., the other vehicle 400) with the emergency lights (i.e., lights 402) that are ON. In response, the spatial monitoring controller 117 activates the haptic seat 130 to provide a haptic feedback V to the vehicle operator.

Figure 16:
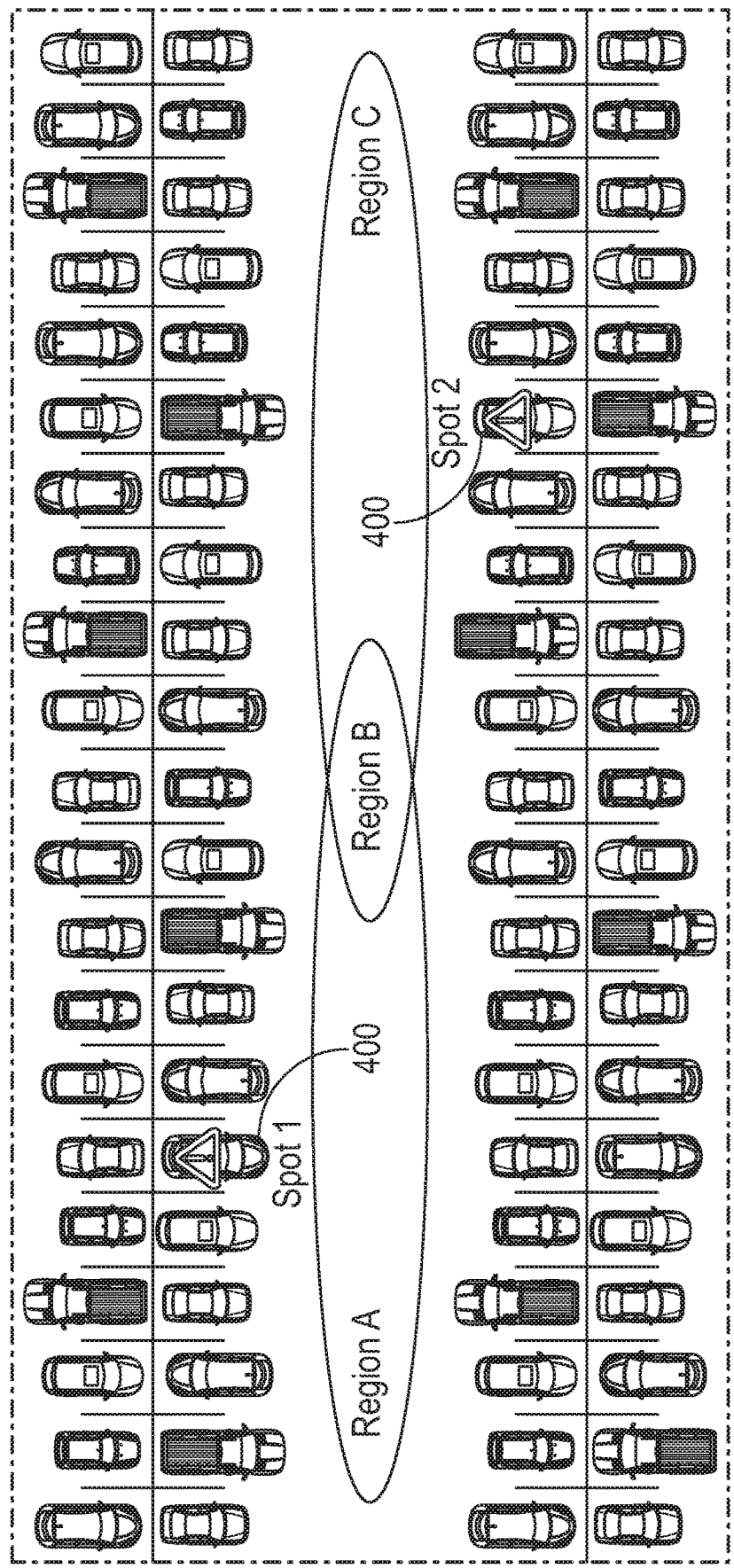
FIG. 16 is a schematic illustration of an example showing how the spatial monitoring controller executes a method for controlling an autonomous vehicle to search for a parking spot.

With reference to FIG. 16, an example of the execution of the method 700 for controlling an autonomous vehicle to search for a parking spot as described above with respect to FIG. 9 is described. In this example, if the lights of the other vehicles 400 in Spot 1 and Spot 2 are observed to be ON, then the trajectory cost for stopping in Region A, Region B, and Region C will be modified accordingly. Specifically, the trajectory cost for stopping in Region A and Region C will be moderately lowered to allow monitoring and possibly occupying Spot 1 and Spot 2 once vacated. The trajectory cost for stopping in Region B will be lowered to a larger extent since it allows to monitor and possibly occupy any of the Spot 1 and Spot 2 once vacated. Consequently, the autonomous vehicle (i.e., the subject vehicle 101) will prefer to wait in Region B for one of the Spot 1 and Spot 2 to be vacated.

The methods disclosed in the present disclosure are depicted as flowcharts illustrating an example method of. The method may be implemented through a computer algorithm, machine executable code, non-transitory computer-readable medium, or software instructions programmed into a suitable programmable logic device(s) of the vehicle, such as the one or more controllers, an infotainment module, the remote server 220 that is in communication with the vehicle computing system, a mobile device such as the hand-held cell phone or tablet (i.e., the handheld device 19A) that is communicating with the vehicle computing system and/or server, another controller in the vehicle, or a combination thereof. Although the various steps shown in the flowchart diagram may appear to occur in a chronological sequence, at least some of the steps may occur in a different order, and some steps may be performed concurrently or not at all.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. For example, the methods described in this disclosure may be combined with one another.

The invention claimed is:

1. A method for controlling an operating vehicle, comprising: determining, via a controller, a confidence level that a light of an other vehicle is ON based on images captured by a camera of the operating vehicle; and controlling, via the controller, an alarm of the operating vehicle based on the confidence level that the light of the other vehicle is ON; wherein controlling, via the controller, the alarm of the operating vehicle includes: determining, via the controller, that the confidence level is greater than a first predetermined threshold; activating, via the controller, the alarm of the operating vehicle in response to determining that the confidence level is greater than the first predetermined threshold; determining, via the controller, that the confidence level is less than a second predetermined threshold; deactivating, via the controller, the alarm of the operating vehicle in response to determining that the confidence level is less than the second predetermined threshold wherein the first predetermined threshold is greater than the second predetermined threshold.

2. The method of claim 1, wherein controlling, via the controller, the alarm of the operating vehicle includes: determining, via the controller, that the confidence level is less than the second predetermined threshold; and maintaining, via the controller, the alarm of the operating vehicle deactivated in response to determining that the confidence level is less than the first predetermined threshold.

3. The method of claim 1, wherein the alarm includes a haptic feedback emitted from a haptic seat of the operating vehicle.

4. A method for controlling an operating vehicle, comprising:
determining, via a controller, a confidence level that a light of an other vehicle is ON based on images captured by a camera of the operating vehicle; and
controlling, via the controller, an alarm of the operating vehicle based on the confidence level that the light of the other vehicle is ON;
determining, via the controller, that the confidence level is greater than a first predetermined threshold; and
redistributing computational resources of the controller to increase an allocation of the computational resources of the controller used to visually analyze the other vehicle in response to determining that the confidence level is greater than the first predetermined threshold.

5. The method of claim 4, further comprising:
determining, via the controller, that the confidence level is less than a second predetermined threshold; and
redistributing computational resources of the controller to decrease an allocation of the computational resources of the controller used to visually analyze the other vehicle in response to determining that the confidence level of is less than the second predetermined threshold.

6. The method of claim 1, further comprising updating, via the controller, a trajectory cost based on a speed of the operating vehicle and the confidence level.

7. The method of claim 6, wherein updating the trajectory cost includes increasing the trajectory cost as a function of the confidence level, wherein an increase in the trajectory cost is proportional to the confidence level.

8. The method of claim 7, wherein updating the trajectory cost includes increasing the trajectory cost as a function of a speed of the operating vehicle, wherein an increase in the trajectory cost is proportional to the speed of the operating vehicle.

9. The method of claim 8, further comprising updating a maximum allowed speed of the operating vehicle as a function of the confidence level, wherein the maximum allowed speed of the operating vehicle is inversely proportional to the confidence level.

10. The method of claim 9, further comprising:
determining a distance from the operating vehicle to the other vehicle;

wherein updating the trajectory cost includes increasing the trajectory cost as a function of the distance from the operating vehicle to the other vehicle; and wherein an increase in the trajectory cost is inversely proportional to the distance from the operating vehicle to the other vehicle.

11. The method of claim 10, further comprising updating a minimum allowed distance from the operating vehicle to the other vehicle as a function of the confidence level, wherein the minimum allowed distance from the operating vehicle to the other vehicle is directly proportional to the confidence level.

12. The method of claim 11, further comprising determining a final trajectory of the operating vehicle based on the trajectory cost, the maximum allowed speed of the operating vehicle, and the minimum allowed distance from the operating vehicle to the other vehicle.

13. The method of claim 1, further comprising:
after determining the confidence level that the light of the other vehicle is ON, determining a confidence level that a reverse light of the other vehicle is ON; and
determining a time from the determining the confidence level that the light of the other vehicle is ON to a present moment; and
updating a trajectory cost of the operating vehicle as a function of the time, the confidence level that the light of the other vehicle is ON, and the confidence level that a reverse light of the other vehicle is ON.

14. The method of claim 1, wherein determining the confidence level that the light of the other vehicle is ON includes:
bounding the other vehicle in a bounding box;
using, via the controller, an orientation of the other vehicle to identify areas of interest as possible pixel locations for the light of the other vehicle;
and searching, via the controller, for predetermined pixel color ranges in the areas of interest;
searching, via the controller, for a difference in brightness between the areas of interest and a remaining area within the bounding box.

15. A subject vehicle, comprising:
a vehicle body;
a camera coupled to the vehicle body, wherein the camera is configured to capture images;
a controller coupled to the camera, wherein the controller is programmed to:
continuously determine a confidence level that a light of an other vehicle is ON based on the images captured by the camera; and
control an alarm of the subject vehicle based on the confidence level that the light of the other vehicle is ON; and
update a trajectory cost based on a speed of the subject vehicle and the confidence level.

16. The subject vehicle of claim 15, wherein, in determining the confidence level that the light of the other vehicle is ON, the controller is programmed to:
bound the other vehicle in a bounding box;
use an orientation of the other vehicle to identify areas of interest as possible pixel locations for the light of the other vehicle;
search for predetermined pixel color ranges in the areas of interest;
search for a difference in brightness between the areas of interest and a remaining area within the bounding box;
determine that the light of the other vehicle is ON in response to:
determining that a predetermined color pixel ranges are found in the areas of interest; and
determining that the difference in brightness between the areas of interest and the remaining area within the bounding box is greater than a predetermined brightness threshold;
wherein the controller is further programmed to:
activate the alarm of the subject vehicle in response to determining that the confidence level is greater than a first predetermined threshold, wherein the alarm includes a haptic feedback emitted from a haptic seat of the subject vehicle;
redistribute computational resources of the controller to increase an allocation of the computational resources of the controller used to visually analyze the other vehicle in response to determining that the confidence level is greater than the first predetermined threshold;
increase the trajectory cost as a function of the confidence level, wherein the increase in the trajectory cost is proportional to the confidence level;
increase the trajectory cost as a function of a speed of the subject vehicle, wherein the increase in the trajectory cost is proportional to the speed of the subject vehicle;
update a maximum allowed speed of the subject vehicle as a function of the confidence level, wherein the maximum allowed speed of the subject vehicle is inversely proportional to the confidence level;
determine a distance from a from a potential trajectory to the other vehicle; increase the trajectory cost as a function of the distance from the potential trajectory to the other vehicle, wherein the increase in the trajectory cost is inversely proportional to the distance from the potential trajectory to the other vehicle;
update a minimum allowed distance from the subject vehicle to the other vehicle as a function of the confidence level, wherein the minimum allowed distance from the subject vehicle to the other vehicle is directly proportional to the confidence level;
generate a final trajectory of the subject vehicle based on the trajectory cost, the maximum allowed speed of the subject vehicle, and the minimum allowed distance from the subject vehicle to the other vehicle;
control the subject vehicle to follow the final trajectory; and
after activating the alarm, deactivating the alarm in response to determining that the confidence level is less than a second predetermined threshold, wherein the first predetermined threshold is greater than the second predetermined threshold.

* * * * *